(12) United States Patent
Orantes et al.

(10) Patent No.: US 11,040,716 B2
(45) Date of Patent: Jun. 22, 2021

(54) METHOD AND APPARATUS TO CONTROL VEHICLE AUTOMATIC ENGINE STOP-START SYSTEM INCLUDING PREFERENCE RETENTION

(71) Applicant: Autostop Saver LLC, Jacksonville, FL (US)

(72) Inventors: Justin Orantes, Jacksonville, FL (US); Slava Zharichenko, Mechanicsburg, PA (US)

(73) Assignee: AUTOSTOP SAVER LLC, Jacksonville, FL (US)

( * ) Notice: Subject to any disclaimer, the term of this patent is extended or adjusted under 35 U.S.C. 154(b) by 0 days.

(21) Appl. No.: 16/698,716

(22) Filed: Nov. 27, 2019

(65) Prior Publication Data

US 2020/0164878 A1 May 28, 2020

Related U.S. Application Data

(60) Provisional application No. 62/771,989, filed on Nov. 27, 2018.

(51) Int. Cl.
*F02N 11/08* (2006.01)
*B60W 10/06* (2006.01)
(Continued)

(52) U.S. Cl.
CPC ..... *B60W 30/18018* (2013.01); *B60R 16/023* (2013.01); *B60R 16/03* (2013.01);
(Continued)

(58) Field of Classification Search
CPC ............. B60W 30/18018; B60W 10/06; F02D 2400/11; F02N 11/0803; F02N 11/0818;
(Continued)

(56) References Cited

U.S. PATENT DOCUMENTS 9,989,005 B1 * 6/2018 Silvestri .............. F02D 41/2487
2011/0234427 A1 * 9/2011 Ingram ................. G06F 16/248
340/995.1

(Continued)

OTHER PUBLICATIONS

"Auto Start Stop Sucks! Fixing the Annoying feature Every Ford F150 Owner Hates!!"; https://www.youtube.com/watch?v=Paacud8Y9ag: Upload Date: Nov. 12, 2018.

*Primary Examiner* — George C Jin
(74) *Attorney, Agent, or Firm* — Birch, Stewart, Kolasch & Birch, LLP.

(57) ABSTRACT

An automatic stop-start preference retaining circuit for selectively disabling an automatic stop-start circuit in a vehicle is disclosed. The automatic stop-start preference retaining circuit is controlled by an on-vehicle switch that selectively deactivates and activates the automatic stop-start circuit in the vehicle. The automatic stop-start preference retaining circuit includes an energy storage device that obtains power from the automatic stop-start circuit in the vehicle. The preference retaining circuit also includes an electronic control module that is configured to receive power from the energy storage device when power is unavailable from the automatic stop-start circuit of the vehicle. The electronic control module is configured in series in a path between the on-vehicle switch and a wiring harness of the vehicle that includes the automatic stop-start circuit. The control module selectively overrides the on-vehicle switch to deactivate or activate the automatic stop-start circuit.

20 Claims, 5 Drawing Sheets

(51) Int. Cl.
  *B60W 30/18*     (2012.01)
  *B60R 16/03*     (2006.01)
  *B60R 16/023*    (2006.01)

(52) U.S. Cl.
  CPC ......... *B60W 10/06* (2013.01); *F02N 11/0822* (2013.01); *F02D 2400/11* (2013.01)

(58) Field of Classification Search
  CPC ............. F02N 11/0822; F02N 11/0825; F02N 11/0829; F02N 11/084; F02N 11/087; B60R 16/03; B60R 16/023
  See application file for complete search history.

(56) References Cited

U.S. PATENT DOCUMENTS

| | | | |
|---|---|---|---|
| 2013/0231848 A1* | 9/2013 | Roberts | B60W 30/18018 701/112 |
| 2014/0207351 A1* | 7/2014 | Mosher | F02D 28/00 701/70 |

* cited by examiner

METHOD AND APPARATUS TO CONTROL VEHICLE AUTOMATIC ENGINE STOP-START SYSTEM INCLUDING PREFERENCE RETENTION

CROSS-REFERENCE TO RELATED APPLICATIONS

This application claims the benefit under 35 U.S.C. § 119(e) of the filing date of U.S. Patent Application No. 62/771,989, for METHOD AND APPARATUS TO CONTROL VEHICLE AUTOMATIC ENGINE STOP-START SYSTEM, which was filed on Nov. 27, 2018, and which is incorporated here by reference.

BACKGROUND

This specification relates to controlling automatic stop-start systems in vehicles. In automobiles with a conventional stop-start system, the stop-start system automatically shuts off and restarts the internal combustion engine when the vehicle is at a complete stop to reduce the amount of time the engine spends idling, thereby reducing fuel consumption and emissions. Under normal driving conditions, when the driver releases their foot from the brake pedal, the engine restarts automatically.

Turning a vehicle engine off and on frequently, e.g., at traffic lights, instead of idling, may cause premature wear of the vehicle's starter system. Furthermore, many drivers consider this automatic shutoff an inconvenience and prefer to deactivate the automatic stop-start function of their vehicles.

Most vehicles equipped with an automatic stop-start system include a momentary push button switch that allows drivers to deactivate and reactivate the function manually. However, with each ignition key cycle, many of these vehicles are configured to automatically default back to a state or mode in which the function is active, e.g., reactivated. This reactivation frustrates vehicle owners who then seek out ways to permanently deactivate the automatic stop-start system. As used herein, ignition key cycle refers to a driver generated start instruction traditionally produced by an ignition key, but now sometimes produced by a push button in a keyless ignition system.

SUMMARY

The present application is directed to an automatic stop-start mode preference retaining circuit for changing the mode of the automatic stop-start system in vehicles and retaining a driver's preferred mode for the automatic stop-start system across ignition key cycles. In an exemplary embodiment, an intermediary harness with a control module automatically retains a driver's automatic stop-start mode preference, e.g., the previously selected stop-start mode, to ensure that the automatic stop-start system of a vehicle is in a state or mode corresponding to the driver's preference when the vehicle is turned on after an ignition key cycle. This control module is plug-and-play allowing the module to be easily retrofitted into various vehicle applications.

In general, one innovative aspect described in this specification can be embodied in an automatic stop-start preference retaining circuit for selectively deactivating an automatic stop-start circuit in a vehicle.

The automatic stop-start preference retaining circuit selectively deactivates the automatic stop-start circuit in a vehicle having an engine, the automatic stop-start circuit being responsive to an on-vehicle switch to select between an automatic stop-start mode and an always running mode for the vehicle engine, the vehicle being provided with an ignition switch to allow the driver to manually start and stop the vehicle engine, the automatic stop-start preference retaining circuit having a connection to the on-vehicle switch, the automatic stop-start preference retaining circuit being controlled by the on-vehicle switch and selectively deactivating and activating the automatic stop-start circuit in the vehicle.

The automatic stop-start preference retaining circuit includes an energy storage device that obtains power from the vehicle automatic stop-start circuit; and an electronic control module configured to receive power from the energy storage device when power is not available from the automatic stop-start circuit of the vehicle; the electronic control module being electrically positioned between the on-vehicle switch and the automatic stop-start circuit. The electronic control module stores the state of the automatic stop-start circuit and selectively simulates operation of the on-vehicle switch to deactivate or activate the automatic stop-start circuit based on the state stored in said electronic control module when the vehicle is next started.

It is apparent that the disclosure of the present application is a description of an exemplary embodiment of the present application which embodiment is not intended to be limiting, the scope of applicants' invention being solely defined by the appended claims. However, the subject matter described in this specification can be implemented in particular embodiments so as to realize one or more of the following advantages obtained from the invention defined by the appended claims.

Contrary to existing aftermarket solutions for defeating automatic stop-start in a vehicle, the exemplary preference-retaining automatic stop-start system is modified according to the teachings of the present application which provides an automatic stop-start preference retaining circuit that does not require a power source separate from one that is supplied by the vehicle's stop-start circuitry, additional wiring, or the occupation of the On-Board Diagnostics (OBD) port.

The exemplary preference-retaining automatic stop-start system includes a plug-and-play intermediary harness that connects into the circuit of an existing automatic stop-start system to obtain power from the circuit. The intermediary harness includes a control module that stores a driver's preference for the automatic stop-start system and is programmed to obtain a driver's preferred mode for the automatic stop-start system and retain the driver's preferred mode across ignition key cycles. With each new ignition key cycle, the preference retaining automatic stop-start system can compare the stored preference with the vehicle's automatic stop-start mode and modify the vehicle's automatic stop-stall mode if it does not match with the stored preference. The automatic stop-start preference retaining circuit also includes a capacitor that obtains power from the vehicle's automatic stop start circuit in order to power the automatic stop-start preference retaining circuit of the preference-retaining automatic stop-start system.

Typically, the embodiments of the present invention reverse engineer preference retention into the automatic stop-start systems of OEM vehicle manufacturers. It is accordingly advantageous for the automatic stop-start preference retaining circuit to utilize OEM-style connectors. Thus, the automatic stop-start preference retaining circuit may be readily retrofitted into various vehicles. Additionally, since the automatic stop-start preference retaining circuit is plug-and-play, the circuit may be easily removed from a vehicle, since the circuit does not require permanent modifications to the wiring of the vehicle.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
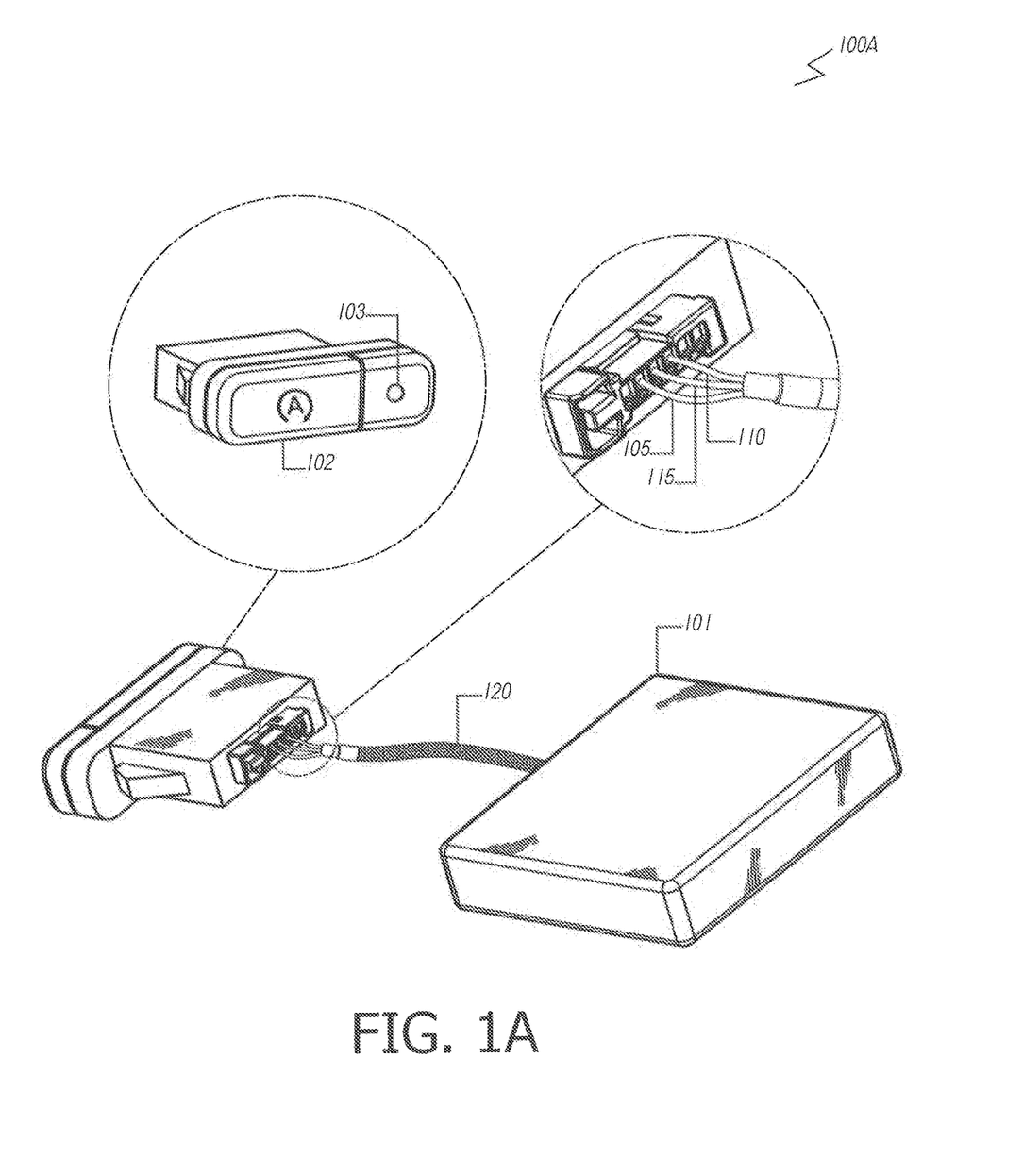
FIG. 1A illustrates a conventional automatic stop-start system in a vehicle.

FIG. 1A illustrates a conventional automatic stop-start system in a vehicle. The conventional automatic stop-start system 100A includes a vehicle automatic stop-start control unit 101 that is connected, using an existing wiring harness 120, to a momentary push button switch 102 and an LED indicator light 103. As illustrated in FIG. 1A, these components are connected using the existing wiring harness 120, which contains at least three wires: one for ground 110, one for mode control of the automatic stop-start system 115, and one for an LED circuit 105 which provides a voltage for illuminating the LED.

When the driver activates the vehicle ignition system, e.g., by turning a key to start the ignition, the conventional stop start system 100A is energized. The automatic stop-start control unit 101 communicates with momentary push button switch 102 by analog circuit polling. This process uses the control unit 101 to deliver a continuous direct current to the circuit, while anticipating an interruption, (voltage drop). This voltage drop occurs by momentarily grounding the energized circuit when the push button switch 102 is pressed since the push button switch 102 is connected to ground. When a driver presses the push button switch 102, the circuit experiences an interruption, e.g., a voltage drop, signaling a change to the state of the automatic stop-start system 100A. This brief change in state signals and registers the desired change on the control unit 101.

A driver can use the momentary push button switch 102 to manually control the mode of the automatic stop-start system 100A. Two exemplary modes are activated and deactivated, e.g., "ON" or "OFF." Initially, the automatic stop-start system 100A may be activated, e.g., in an "ON" mode. When the driver presses the push button switch 102, the automatic stop-start system 100A may then change to "OFF" and deactivate the automatic stop-start system, meaning that the vehicle will not automatically shut off the engine when the vehicle comes to a stop. The LED indicator light 103 subsequently indicates the status or mode of the automatic stop-start system 100A.

Figure 1B:
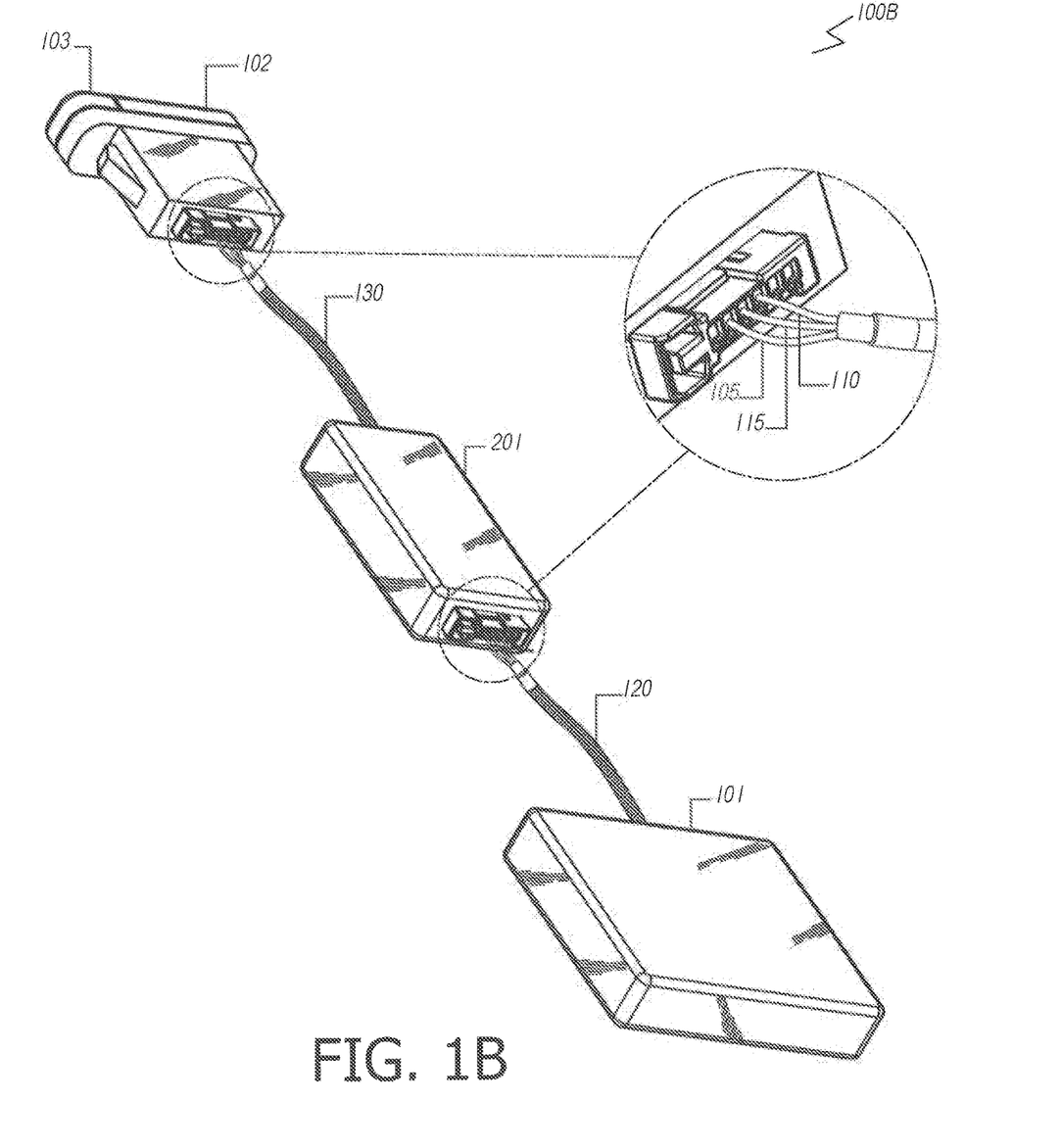
FIG. 1B illustrates an example preference-retaining automatic stop-start system in a vehicle.

In some embodiments, when the automatic stop-start system 100A is active, the LED indicator light 103 is illuminated, indicating that the automatic stop-start system is activated. In some embodiments, when the automatic stop-start system 100B is deactivated, the LED indicator light 103 is not illuminated, indicating that the automatic stop-start system has been deactivated. In other embodiments, the LED indicator light 103 may be illuminated to expressly show the driver that the automatic stop-start system is off or deactivated. The LED indicator status indicating the vehicle's current automatic stop-start mode may vary depending on the vehicle's make and model.

With each ignition key cycle, e.g., starting the ignition of the vehicle, the automatic stop-start system 100A is typically reset to the default mode of active, or "ON", and the LED indicator light 103 may be configured to correspond with this default mode, By returning to a default mode, the vehicle requires the driver to press the push button switch 102 each ignition key cycle to deactivate the automatic stop-start system. Conventional automatic stop-start systems, e.g., system 100A, do not retain the preference of a driver to determine the mode of the automatic stop-start system.

FIG. 1B illustrates an example preference-retaining automatic stop-start system 100B in a vehicle that retains a driver's automatic stop-start preference for the mode of the automatic stop-start system between ignition key cycles. As illustrated, an example preference-retaining automatic stop-start system 100B includes the components of the conventional automatic stop-start system with the addition of a control module 201 and a plug-and-play intermediary harness 130.

The control module 201 and intermediary harness 130 are installed between the momentary push button switch 102 and the wiring harness 120 in the vehicle. By placing the control module 201 and intermediary harness 130 between these vehicle components, the exemplary preference-retaining automatic stop-start system 100B effectively severs the existing circuit and adds a new control module that includes a preference retaining circuit with memory for storing automatic stop-start mode preference and a capacitor to harvest and retain power from the automatic stop-start circuit of the vehicle. Details about this automatic stop-start preference retaining circuit will be described below with respect to FIG. 3.

As illustrated in FIG. 1B, the intermediary harness 130 is connected to the switch 102 and LED indicator light 103 by at least three wires, one for ground 110, one for control of the automatic stop-start circuit 115, and one for reading an LEI) state change 105. The control module 201 connects to the existing vehicle wiring harness 120 and the vehicle control unit 101 using at least three wires representing the same three lines. The control module 201 is able to control the analog power signals between the momentary push button switch 102 and the automatic stop-start control unit 101.

Figure 2:
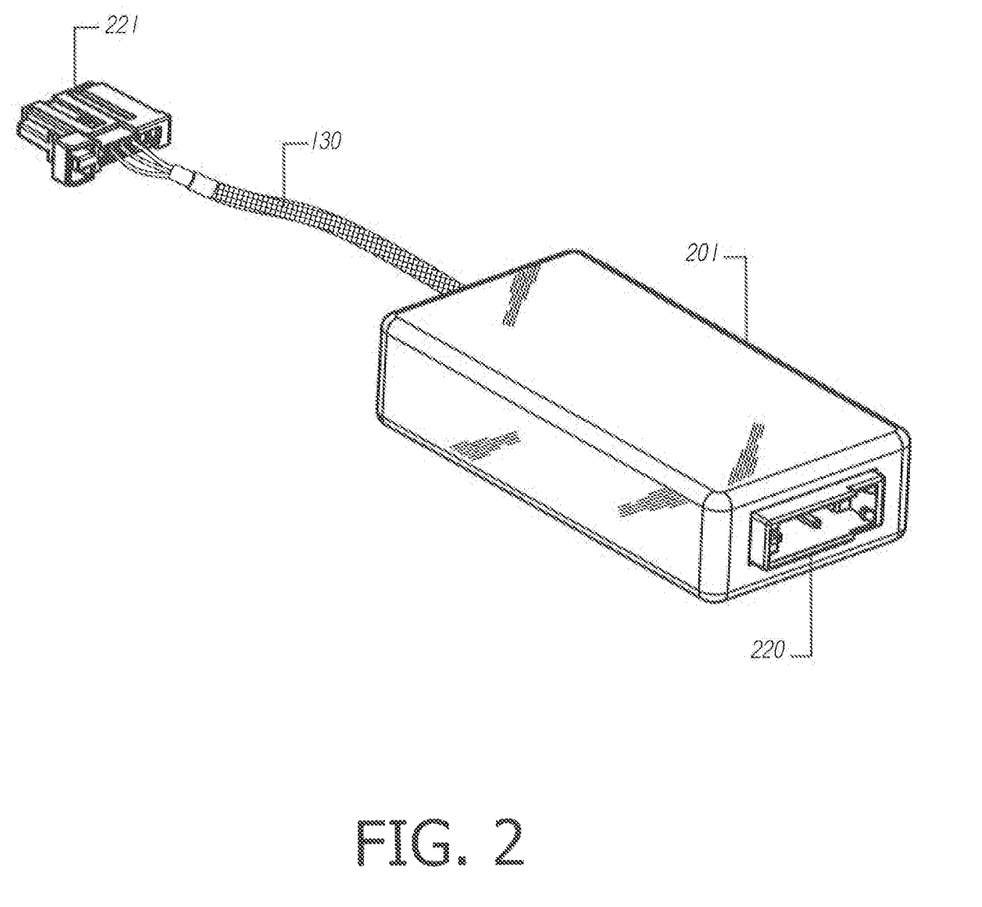
FIG. 2 illustrates an intermediary harness including a control module of an example preference-retaining automatic stop-start system.

FIG. 2 illustrates an example intermediary harness 130 with a control module 201. The control module 201 provides the physical containment for a printed circuit board assembly necessary to retain a preference for a vehicle's automatic stop-start mode. Details of the functional aspects of the automatic stop-start preference retaining circuit located on the printed circuit board within the control module 201 are illustrated and described with respect to FIG. 3, The intermediary harness 130 and control module 201 together include a pair of typically male and female, OEM-style pin and socket connectors 220 221 that are coupled onto one or more sets of wires. One connector, eg., either of connectors 220 221, is connected to at least three pins from the switch 102. These pins include ground, control of the automatic stop-start circuit, and the LED status. The other connector 220 221, is connected to at least three wires from the wiring harness 120 including ground, control of the automatic stop-start circuit, and the LED. It should be understood that the use of connectors and the number of wires passing thought the intermediary harness 130 and control module 201 may vary depending on the construction of the vehicle wiring harness and vehicle as would be understood by one of ordinary skill in the art. Other embodiments and configurations that provide ground, access to the automatic stop-start circuit, and the LED state change to the control module are contemplated. Typically, the intermediary wiring harness 130 is positioned behind the switch so that the electronic control module 201 is hidden behind the dashboard.

Figure 3:
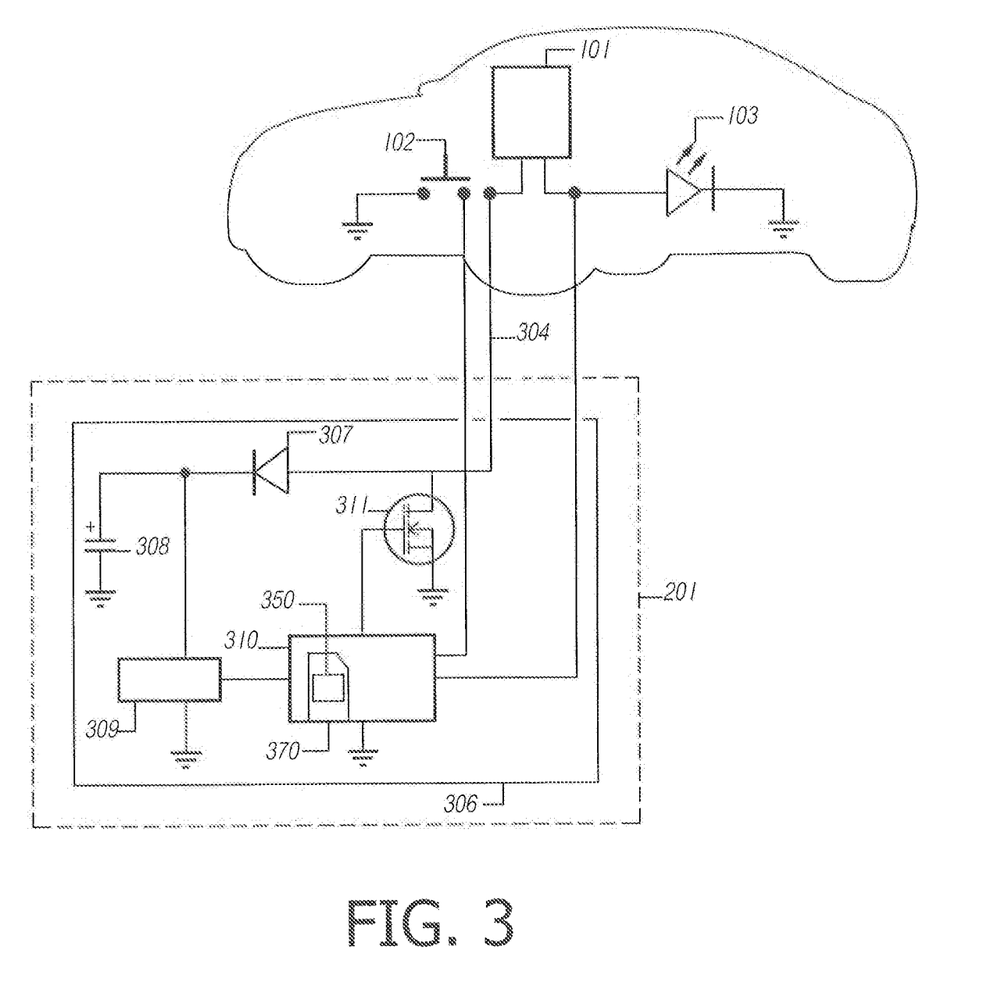
FIG. 3 illustrates automatic stop-start preference-retaining circuit within the control module of intermediary harness of FIG. 2.

FIG. 3 illustrates an example preference-retaining automatic stop-start system 100B with an automatic stop-start preference retaining circuit 306 within the control module 201 of FIG. 2.

As disclosed above, when a driver activates the vehicle's ignition system, e.g., by turning a key to start the ignition, the preference-retaining automatic stop-start system 1001 is energized. In an example embodiment, the preference-retaining automatic stop-start system 100B severs and diverts power supplied by a wire, e.g., wire 115, from the vehicle automatic stop-start control unit 101 and channels the power to the automatic stop-start preference retaining circuit 306. A diode 307 allows the electric current from the wire, e.g., wire 115, to flow through the diode 307 until the current reaches the capacitor 308. The diode 307 prevents current from flowing back into the automatic stop-start circuit in the vehicle control unit 101 while ensuring that the capacitor maintains a charge. Once the capacitor, e.g., capacitor 308, is charged, typically to whatever control voltage level as used by the automatic stop-start system logic, the voltage regulator 309 supplies a fixed output voltage to an ultra low-power microcontroller 310. Note that the capacitor 308 typically receives the charge made available through the automatic stop-start system wiring and preferably above the power voltage of the microcontroller 310 and the voltage regulator 309 supplies this charge at a voltage required by the microcontroller 310, in this case 3 volts. As described above, in a conventional system, when the momentary push button switch 102 is pressed, the vehicle automatic stop-start circuit becomes grounded. This grounding causes sudden interruption to connected devices. However, by charging the capacitor 308 to a specific voltage level, the preference-retaining automatic stop-start system 100B harvests and stores energy from the automatic stop-start circuit of the vehicle, allowing the preference-retaining automatic stop-start system 100B to remain powered on and fully operational whenever the momentary push button switch 102 is pressed, e.g., by the driver.

Once the microcontroller 310 receives power, the controller executes an internally stored program 350. This program 350 automatically stores and later retrieves the previous driver selected stop-start mode preference, or a default if no preference has been set, from the non-volatile memory 370 of the microcontroller 310, This is performed under the control of the program described with reference to the flowchart of FIG. 4.

The microcontroller 310 activates transistor 311, when the driver presses the momentary push button switch, e.g., switch 102. The system 100B handles a button press as an indication that a driver desires to manually control the mode of the automatic stop-start system.

By activating transistor 311, the system 100B simulates a momentary button press to pulse the automatic stop-start circuit 101, Typically, this needs to only be for a short duration to reduce stored energy expenditure and since the automatic stop start system is normally responsive to a momentary actuation of the push button switch. The system 100B, e.g., the microcontroller 310, may repeat this process until the vehicle accepts the simulated button press and changes the vehicle's LED indicator to reflect the selection in some embodiments as considered desirable.

Figure 4:
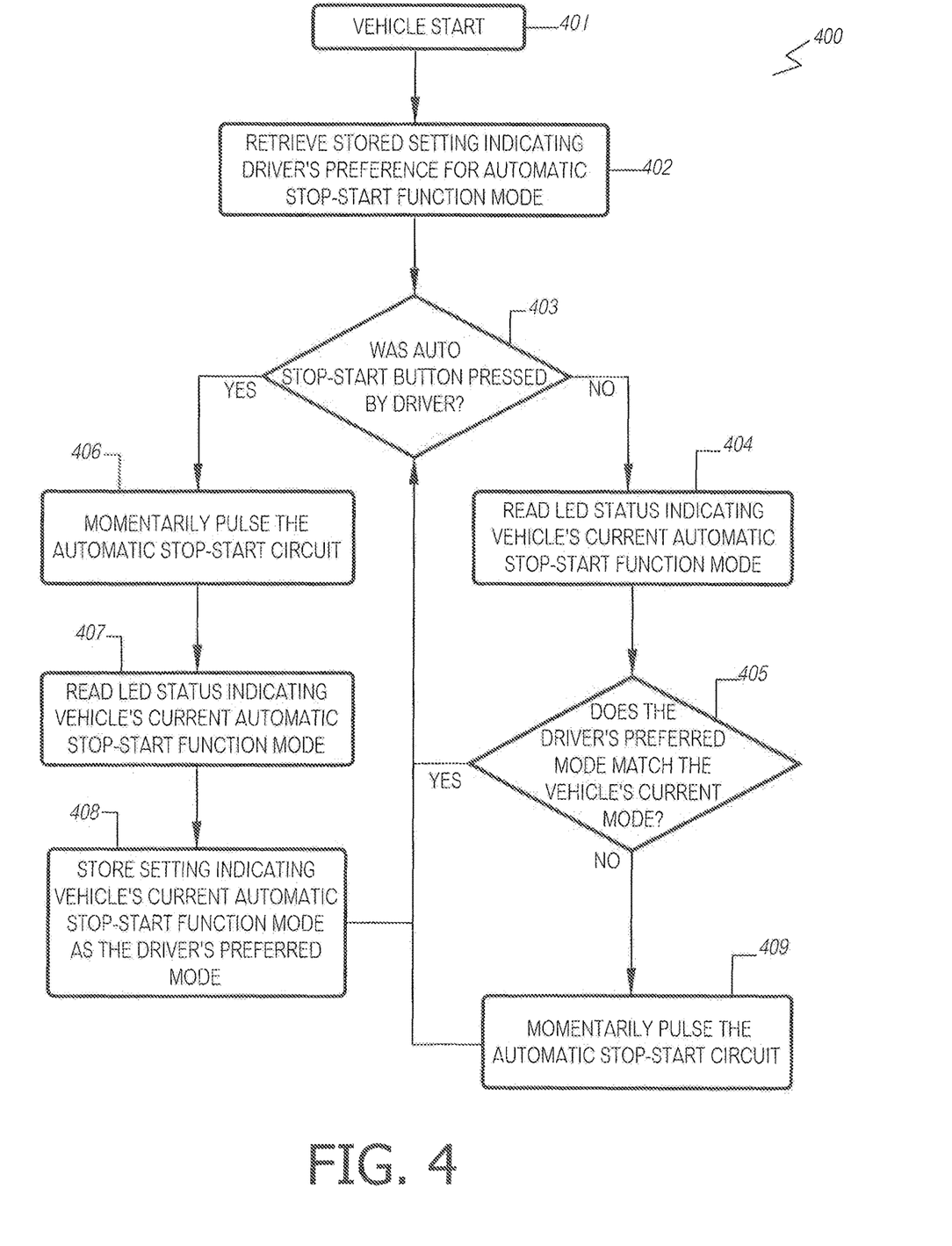
FIG. 4 is a flowchart of an example process for retaining preference for the automatic stop-start system across a vehicle's ignition key cycles.

FIG. 4 is a flowchart of an example process 400 for retaining preference on an automatic stop-start system across a vehicle's ignition key cycles. The process 400 as described may be performed by one or more computers, located in one or more locations, and programmed appropriately in accordance with the specification as would be appreciated by one of ordinary skill in the art. For example, an automatic stop-start system, e.g., the preference-retaining stop-start system 100B of FIG. 1B and FIG. 3, appropriately programmed, can perform process 400.

Upon the starting of the vehicle's engine in step 401, e.g., ignition, the preference-retaining stop-start system 100B retrieves a stored setting indicating a driver's preference for the automatic stop-start function mode 402. The system can obtain the stop-start preference from memory 370 in the microcontroller 310. This memory is preferably non-volatile. If there is no previous stop-start preference from a driver, the system 100B may default the preference to "ON" indicating that the automatic stop-start system should be active or enabled. The system 100B then determines whether a driver subsequently pressed the automatic stop-start push button switch 403.

If the system 100B determines that a driver has pressed the automatic stop-start push button after the system has obtained the stored or default setting for the driver's mode preference, the system 100B simulates a momentary button press to pulse the automatic stop-start circuit at step 406. The system 100B then reads a current status or mode of the automatic stop-start system from the vehicle, e.g., an LED status, 407. The system 100B then stores the setting indicating the vehicle's current automatic stop-start function mode as the driver's preferred mode 408. For example, the vehicle's current automatic stop-start function mode may indicate that the automatic stop-start function is active. The system 100B will then store a preference for the automatic stop-start function mode indicating that the driver's preferred mode is active, e.g., "ON" or enabled. The system 100B1 continues to run the process of FIG. 4 while monitoring for manual changes to the system, e.g., a button press.

If the system 100B determines that a driver has not pressed the automatic stop-start push button after the system has obtained the stored or default setting for the driver's mode preference, the system 100B reads a current status, e.g., LED status, indicating the vehicle's current automatic stop-start function mode 404, The system then compares the stored driver preference with the vehicle's current mode, e.g., as indicated by the LED status 405. If the driver's preference and the vehicle's current mode match, e.g., they indicate the same status or mode, the system 100B runs the process of FIG. 4 while monitoring for manual changes to the system. If the driver's preference and the vehicle's current mode do not match, the system 100B simulates a momentary button press to pulse the automatic stop-start circuit 409 304. The system 100B repeats this process until the vehicle accepts the simulated button press and changes the vehicle's status or mode to reflect the stored setting indicating the driver's preference for the automatic stop-start function mode.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a standalone program or as a module, component, subroutine, or other unit suitable for use in a computing environment. A program may, but need not, correspond to a file in a file system, A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random-access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (MA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially be claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. An automatic stop-start preference retaining circuit for selectively deactivating an automatic stop-start circuit in a vehicle having an engine,
   the automatic stop-start circuit being responsive to an on-vehicle switch to select between an automatic stop-start mode and an always running mode for the vehicle engine, the vehicle being provided with an ignition switch to allow the driver to manually start and stop the vehicle engine, the automatic stop-start circuit selecting the automatic stop-start mode by default each time the vehicle is manually started and stopped by the ignition switch,
   the automatic stop-start preference retaining circuit having a connection to the on-vehicle switch, the automatic stop-start preference retaining circuit being controlled by the on-vehicle switch and selectively deactivating and activating the automatic stop-start circuit in the vehicle each time the vehicle is started and stopped by the ignition switch, the automatic stop-start preference retaining circuit comprising:
   an energy storage device configured to harvest power only from the vehicle automatic stop-start circuit;
   an electronic control module configured to receive power from the energy storage device when power is not available from the automatic stop-start circuit of the vehicle;
   the electronic control module being electrically positioned between the on-vehicle switch and the automatic stop-start circuit;
   the electronic control module storing the state of the automatic stop-start circuit and selectively simulating operation of the on-vehicle switch to deactivate or activate the automatic stop-start circuit based on the state stored in said electronic control module when the vehicle is next started.

2. The automatic stop-start preference retaining circuit of claim 1, further comprising OEM connectors to facilitate interconnection between a wiring harness of the vehicle connected to the automatic stop-start circuit and the on-vehicle switch.

3. The automatic stop-start preference retaining circuit of claim 1, wherein the on-vehicle switch is configured to receive manual input from a driver of the vehicle to determine the driver's automatic stop-start mode preference.

4. The automatic stop-start preference retaining circuit of claim 3 wherein the electronic control module includes memory and, upon receiving manual input from the driver, stores the driver's automatic stop-start mode preference in the memory.

5. The automatic stop-start preference retaining circuit of claim 3, wherein the electronic control module is programmed to obtain the stored automatic stop-start mode preference and a current mode of the automatic stop-start circuit of the vehicle to determine whether the stored stop-start mode preference corresponds with the current mode of the automatic stop-start circuit.

6. The automatic stop-start preference retaining circuit of claim 4, wherein the current mode of the automatic stop-start circuit is obtained from a status of an LED indicator light on the vehicle.

7. The automatic stop-start preference retaining circuit of claim 3, wherein when the on-vehicle switch receives input from driver, the electronic controller determines the driver's desired mode of the automatic stop-start circuit and updates the stored stop-start preference to match the driver's desired mode.

8. The automatic stop-start preference retaining circuit of claim 7, wherein the electronic control module determines the driver's desired mode for the automatic stop-start circuit by obtaining a status of an LED indicator light on the vehicle and setting the desired state based on the status of the LED indicator light.

9. The automatic stop-start preference retaining circuit of claim 8, wherein the electronic control module sets the desired mode to OFF when the LED indicator light indicates a deactivated mode.

10. The automatic stop-start preference retaining circuit of claim 8, wherein the electronic control module sets the desired mode to ON when the LED indicator light indicates an activated mode.

11. The automatic stop-start preference retaining circuit of claim 5, wherein when the driver's stored stop-start mode preference does not correspond with the current mode of the automatic stop-start circuit, the electronic controller momentarily pulses the automatic stop-start circuit.

12. The automatic stop-start preference retaining circuit of claim 11, further comprising the electronic control module pulsing the automatic stop-start circuit until the current mode of the automatic stop-start circuit corresponds with the driver's stored stop-start mode preference.

13. The automatic stop-start preference retaining circuit of claim 1, wherein the energy storage device obtains power from the automatic stop-start circuit in the vehicle.

14. The automatic stop-start preference retaining circuit of claim 1, wherein the electronic control module is configured serially in the path between the on-vehicle switch and the wiring harness.

15. A method for selectively deactivating an automatic stop-start circuit in a vehicle having an engine, the automatic stop-start circuit being responsive to an on-vehicle switch to select between an automatic stop-start mode and an always running mode for the vehicle engine, the vehicle being provided with an ignition switch to allow the driver to manually start and stop the vehicle engine, the automatic stop-start circuit selecting the automatic stop-start mode by default each time the vehicle is manually started and stopped by the ignition switch, the method comprising:
   electrically positioning an automatic stop-start preference retaining circuit having a memory contained therein between the on-vehicle switch and the automatic stop-start circuit using only the vehicle connections to the on-vehicle switch;
   charging an energy storage device in the automatic stop-start preference retaining circuit by harvesting power from the automatic stop-start circuit; and
   using the automatic stop-start preference retaining circuit to simulate operation of the on-vehicle switch to activate or deactivate the automatic stop-start circuit each time the vehicle is started and stopped by the ignition switch with the automatic stop-start preference retaining circuit based on a stored preference using only power from the charged energy storage device.

16. The method of claim 15 wherein the automatic stop-start preference retaining circuit stores the state of the automatic stop-start circuit and selectively simulates the on-vehicle switch to deactivate or activate the automatic stop-start circuit based on the state stored in said electronic control module when the vehicle is next started.

17. The automatic stop-start preference retaining circuit of claim 1 wherein the energy storage device supplies all the power used at any time by the automatic stop-start preference retaining circuit.

18. The automatic stop-start preference retaining circuit of claim 1 wherein all the communication between the automatic stop-start circuit and the automatic stop-start preference retaining circuit is over only two wires.

19. The method of claim 15 wherein the energy storage device supplies all the power used at any time by the automatic stop-start preference retaining circuit.

20. The method of claim 15 wherein all the communication between the automatic stop-start circuit and the automatic stop-start preference retaining circuit is over only two wires.

* * * * *